United States Patent [19]

Tsumura

[11] Patent Number: 5,247,127
[45] Date of Patent: Sep. 21, 1993

[54] MUSICAL CLIMAX DISPLAY DEVICE
[75] Inventor: Mihoji Tsumura, Osaka, Japan
[73] Assignee: Ricos Co., Ltd., Osaka, Japan
[21] Appl. No.: 875,127
[22] Filed: Apr. 28, 1992
[51] Int. Cl.[5] .................. G09B 15/04; G10H 7/00
[52] U.S. Cl. .................. 84/609; 84/645; 84/477 R
[58] Field of Search .................. 84/609–614, 84/634–638, 645, 464 R, 464 A, 477 R, 478, DIG. 12, DIG. 22; 358/342; 369/63–70

[56] References Cited
U.S. PATENT DOCUMENTS
5,131,311 7/1992 Murakami et al. .................. 84/609

Primary Examiner—Stanley J. Witkowski
Attorney, Agent, or Firm—Thompson, Hine and Flory

[57] ABSTRACT

The invention is designed to provide a clear indication, for karaoke purposes, of the point at which a piece of music starts to build to a climax. To this end, the invention first relates warning period data, which is inserted in advance of the climax start position, to the music data and stores it in memory. This warning period data is subsequently read out and matched with the music data for input to a counter, which initiates a count immediately on receipt. At the same time, the warning period is divided into equal warning time intervals, the countdown of which provides a basis for the output of a message advising the user of how long remains before the climax start position.

9 Claims, 2 Drawing Sheets

| ID DATA | WARNING PERIOD DATA (A NUMBER OF CLOCK CYCLES) |

MUSICAL CLIMAX DISPLAY DEVICE

BACKGROUND OF THE INVENTION

1. Field of the Invention

The invention relates to a musical climax display device, which advises a singer, in cases where there is a vocal accompaniment to the music, of the point at which the music starts to move to its climax.

2. Description of the Prior Art

Generally speaking, "karaoke" involves the reproduction of karaoke music while at the same time displaying the lyrics appropriate to that music on a visual display unit. A person is thus able both to listen to the music and at the same time to sing along with it by keeping his eye on the lyrics displayed on the screen.

Most songs, however, have a part which represents what is effectively the peak or climax of that particular piece of music. However, the sort of people who most enjoy karaoke are most often, of course, simply music lovers and not professional singers. Consequently, in their inexperience, they frequently fail to recognize the point at which a song should start to move towards its climax. As a result, they finish the song in a rather disappointing way without having generated a proper build up and climax. The answer to this problem would be to find some way of indicating to the singer precisely where to begin this build up.

It is, of course, already possible, when creating music data on the basis of the MIDI standard, for example, to incorporate a variety of additional information into the basic data, relating most often to features such as pitch, timbre and strength. A reproduction device then converts all this music data into analog signals which subsequently form the basis for the generation of the related musical sounds.

SUMMARY OF THE INVENTION

It is the object of the present invention to resolve the sorts of problems outlined above by finding a simple way of warning the singer of the appropriate point at which to start his build up towards the climax of a song. It is assumed for the purpose of this disclosure that the karaoke music in question is created and reproduced in accordance with the sort of music data described above.

The present invention, which has been designed to achieve the above object, comprises a memory means in which is stored warning period data, which is inserted at a point ahead of the climax start point, a climax data readout means which accesses said memory means in order to read out and match said warning period data with the music data, and an advice control means which issues control instructions to an advice means such that, on receipt of the warning period data output from the climax data readout means, said advice means immediately starts a count while at the same time dividing the warning period into equal warning time intervals which can then be counted down as a means of signifying how long is left before the climax start position.

While music data is in the course of being reproduced, the above design enables the climax data readout means to read the warning period data out of the memory means and to match it with the music data. The warning control means then issues instructions to the warning advice means which, on receipt of said warning period data, immediately starts a count while at the same time dividing the warning period into equal warning time intervals which can then be counted down as a means of signifying how long is left before the climax start position. This in turn enables the singer to achieve a more professional build up to the climax.

DETAILED DESCRIPTION OF THE PREFERRED EMBODIMENT

The following is a detailed description of the preferred embodiment of the invention by reference to the accompanying drawings.

Figure 1:
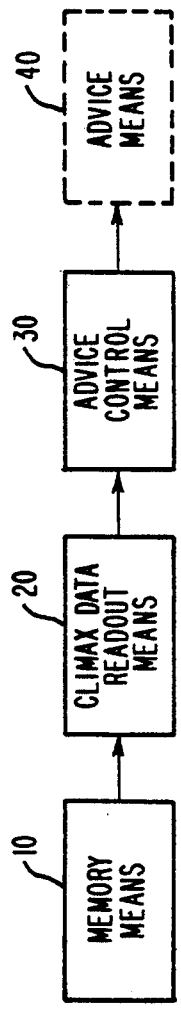
FIG. 1 is a block diagram illustrating the full configuration of the present invention.
Figure 2:
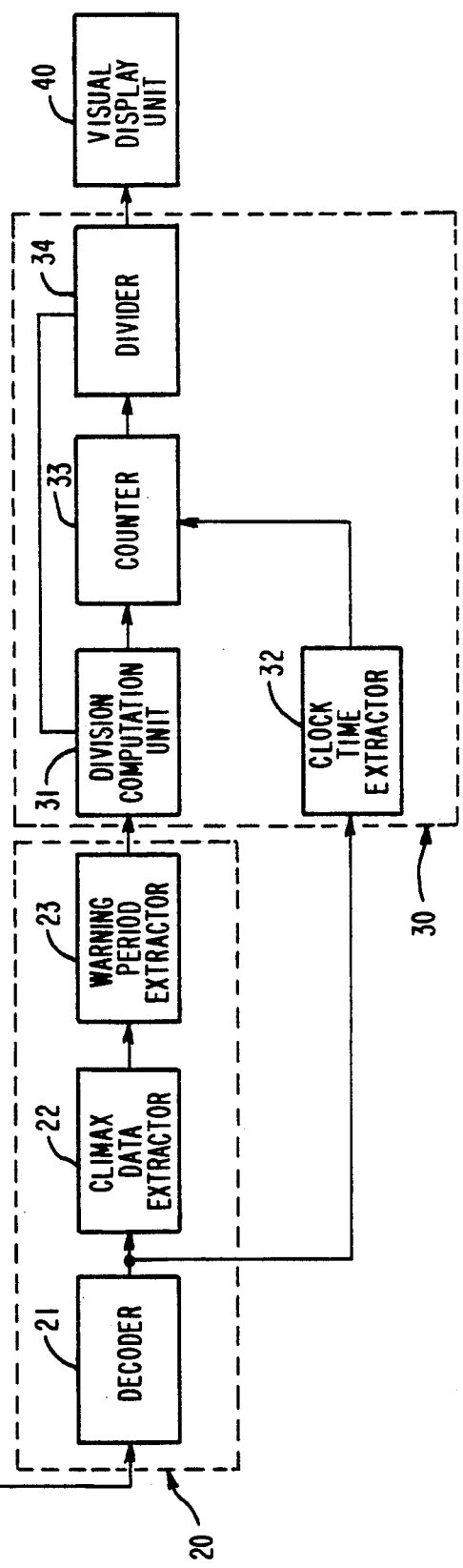
FIG. 2 is a block diagram illustrating the full configuration of the preferred embodiment of the present invention.
Figures 3, 4:
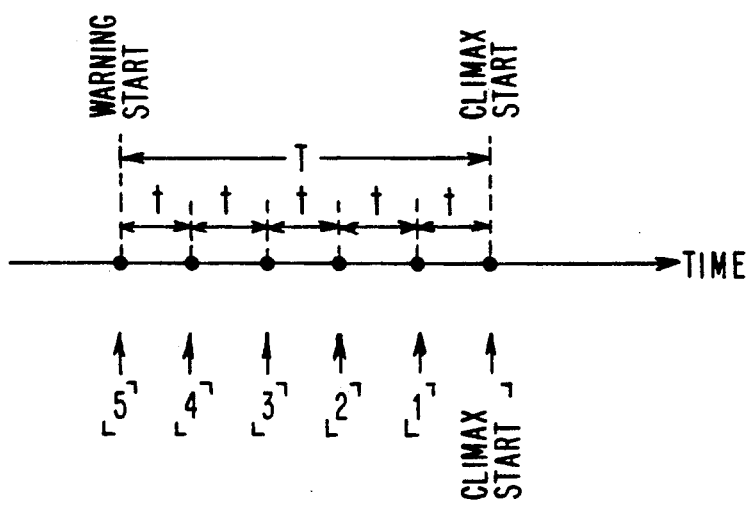
FIG. 3 is an explanatory drawing illustrating the configuration of the climax data.
FIG. 4 is an explanatory drawing illustrating the sequence of steps on the advice display in relation to the time axis.

FIG. 2 shows the climax display device of the preferred embodiment. In the drawing, 10 is a memory means which distinguishes and stores the karaoke music data for each of a plurality of different pieces of music. The music data itself is created in accordance with the MIDI standard and incorporates a range of information relating to musical features such as pitch, timbre and strength. Said memory means 10 also relates the climax data to the appropriate part of the music data for storage purposes. As shown in FIG. 3, the climax data consists of ID data, which serves to relate the climax data to the appropriate part of the music data, and warning period T data. As shown in FIG. 4, the warning period T is the time between the climax start point and the warning start point, which is set at a specified interval in advance of the climax start point. More specifically, the warning period T is input in the form of a number of clock cycles.

Said memory means 10 is connected to a reproduction device 50, which reads music data from the memory means 10 for use in the creation of the analog signals that are used as a basis for the output of musical sounds.

The memory means 10 is also connected to a decoder 21 which is in turn connected to a climax data extractor 22 and a warning period extractor 23 in that order, said climax data extractor 22 being used to read out climax data and said warning period extractor 23 being used to read out the warning period T.

Connected to the warning period extractor 23 is a division computation unit 31, which divides the warning period T into equal warning time intervals t while at the same time setting a warning position count number for each of the warning time intervals t in the warning period T. To be more precise, if, for example, the warning period T is divided into five equal warning time intervals t, then t will necessarily be equal to T/5 and the warning position count numbers will be "0", "t", "2t", "3t", "4t" and "5t(=T)". Also connected to the decoder 21 is a clock time extractor 32, which extracts the clock time signal from the memory means 10. Said division computation unit 31 is also connected to a counter 33 which, on receipt of a clock time signal from said clock time extractor 32 and of the warning period T data from the division computation unit 31, immediately initiates the count operation. Said counter 33 is also connected to a divider 34, which is in turn connected to a visual display unit 40 that functions as the advice means. The warning position count number set by said division computation unit 31 is input to the divider 34 and, when the output from the counter 33 corresponds to said warning position count number, a warning signal is output from said divider 34 to the visual display unit 40 which duly displays the countdown sequence "5", "4", "3", "2", "1", "start build up" in accordance with the warning position count numbers "0", "t", "2t", "3t", "4t", "T". In this way, the countdown display is able to indicate to the singer just how long he has left before he needs to start building up towards the climax of his song.

In the above configuration, the decoder 21, the climax data extractor 22 and the warning period extractor 23 together make up the climax data readout means 20, which is used to access the memory means 10 and to read out and match the warning period data with the music data. At the same time, the division computation unit 31, the clock time extractor 32, the counter 33 and the divider 34 together make up the advice control means 30, which issues control instructions to an advice means 40 such that, on receipt of the warning period data output from the climax data readout means 20, said advice means 40 starts a count and then divides the warning time into equal warning time intervals on the basis of which it is then able to advise the singer of how long he has left before the start of the climax.

The preferred embodiment outlined above is thus designed to operate such that, when said warning period data is received, a count is started and the warning time T is divided into equal warning time intervals t on the basis of which the singer can then be advised of how long he has left before he needs to start his build up towards the climax. This in turn enables the singer to achieve a more professional musical build up.

Although for the purposes of the example of the preferred embodiment described above, we have assumed that the warning period T is divided into five equal warning time intervals t, the number of divisions need not, of course, be confined to five. Similarly, the visual method which is used to advise the singer of how long he has left before the climax start position need not be a countdown sequence of the type "5", "4", "3", "2", "1" but could just as easily be a count-up sequence instead or, indeed, any of a vast number of other visual warning methods.

Again, the use of a warning means other than the visual display unit 40, which is used to display the visual countdown message in the preferred embodiment outlined above, would be equally acceptable. Alternatives might include, for example, an aural warning message output using a speaker or else a combination of both visual and aural means.

What is claimed is:

1. A climax display device comprising
    (a) memory means in which warning period data, which has been inserted in a position in advance of a climax start point, is related to the relevant music data and stored,
    (b) climax data readout means, which accesses said memory means and reads out and matches said warning period data with said music data, and
    (c) advice control means which issues control instructions to an advice means such that, on receipt of said warning period data output from the climax data readout means, said advice means starts a count while at the same time dividing the warning period into a plurality of equal warning time intervals which can then be simultaneously counted down and displayed as a means of signifying time left before the climax start point.

2. The climax display device according to claim 1 in which
    said music data is created in accordance with the MIDI standard.

3. The climax display device according to claim 1 in which
    said memory means relates the climax data to said music data and then stores it,
    said climax data comprises ID data, which is required to relate said climax data to said music data, and warning period data, and
    said warning period is the period between the climax start position and the warning start position, said warning start position being set at a specified interval prior to the climax start position.

4. The climax display device according to claim 3 in which
    said warning period is input in terms of clock cycles.

5. The climax display device according to claim 1 in which
    said memory means is connected to a reproduction means which reads said music data out of said memory means, creates analog signals on the basis of said music data and outputs sounds in accordance with said analog signals.

6. The climax display device according to claim 3 in which
    the aforementioned climax data readout means comprises
    (d) a decoder which is connected to said memory means,
    (e) a climax data extractor which is connected to said decoder and which reads out climax data, and
    (f) a warning period extractor which is connected to said climax data extractor and which reads the warning period out of said climax data.

7. The climax display device according to claim 6 in which
    the aforementioned advice control means comprises
    (g) a division computation means, which is connected to said warning period extractor and which divides said warning period into equal warning time intervals which it then uses one by one as a basis for the setting of warning position count numbers during said warning period,
    (h) a clock time extractor which is connected to the aforementioned decoder and which extracts clock time signals from said memory means,
    (i) a counter which is connected to said division computation means and which initiates a count operation immediately a clock time signal is input from said clock time extractor and said warning period data is input to said division computation means, and
    (j) a divider which is connected both to said counter and also to the aforementioned advice means and which receives the warning position count numbers set by said division computation means and, when the output from said counter corresponds to said warning position count numbers, outputs warning signals to the advice means which duly displays an appropriate warning message in accordance with the warning position count numbers such that the countdown display indicates the time left before the climax start position.

8. The climax display device according to claim 7 in which said advice means is a visual display unit which outputs a visual message.

9. The climax display device according to claim 7 in which said advice means outputs an aural message.

* * * * *